Figure 1:
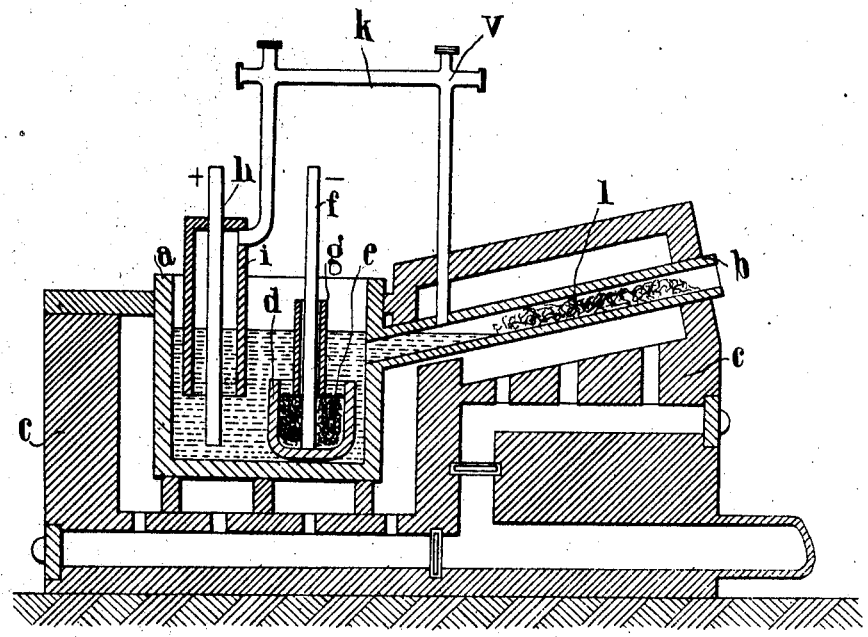

G. H. BAILEY AND G. W. A. FOSTER.
PRODUCTION AND UTILIZATION OF MAGNESIUM CHLORID.
APPLICATION FILED SEPT. 29, 1917.

1,331,688.  Patented Feb. 24, 1920.

UNITED STATES PATENT OFFICE.

GEORGE HERBERT BAILEY AND GLYN WILLIAM ARNOLD FOSTER, OF LONDON, ENGLAND, ASSIGNORS TO THE BRITISH ALUMINIUM COMPANY LIMITED, OF LONDON, ENGLAND.

PRODUCTION AND UTILIZATION OF MAGNESIUM CHLORID.

1,331,688.     Specification of Letters Patent.     Patented Feb. 24, 1920.

Application filed September 29, 1917. Serial No. 194,076.

*To all whom it may concern:*

Be it known that we, GEORGE HERBERT BAILEY, D. Sc., Ph. D., a subject of the King of Great Britain and Ireland, and GLYN WILLIAM ARNOLD FOSTER, B. Sc., a subject of the King of Great Britain and Ireland, both residing at 109 Queen Victoria street, London, E. C. 4, England, have invented certain new and useful Improvements Relating to the Production and Utilization of Magnesium Chlorid, of which the following is a specification.

This invention relates to the production and utilization of anhydrous magnesium chlorid.

As magnesium chlorid occurs ordinarily in the hydrated form, it must, before being used for the production of magnesium, be dehydrated. This dehydration is usually carried out by cautiously heating a double salt of the magnesium chlorid with ammonium chlorid.

The magnesium and ammonium salts are dissolved in water and carefully evaporated. The cake of mixed salts must then be very carefully dried before fusion. During the fusion, the ammonium chlorid is driven off, the anhydrous magnesium chlorid remaining as a liquid. The ammonium chlorid driven off is difficult if not impossible to recover, and there is always a certain amount of decomposition of the magnesium chlorid. The process is also very tedious and costly.

The electrolysis of magnesium chlorid, and the regeneration of the electrolyte by causing the chlorin liberated at the anode to re-act on magnesia producing magnesium chlorid and giving off carbon monoxid are well known, and we do not claim such processes broadly. In the processes hitherto proposed, the interaction of the liberated chlorin and magnesia is not complete, and provision is made for the escape to the atmosphere of part of the chlorin liberated in the electrolytic bath, necessitating periodical interruptions of the process for further supplies of magnesium chlorid to the cell.

The principal object of this invention therefore is to greatly simplify and cheapen the production of anhydrous magnesium chlorid by avoiding the use of aqueous solutions, and further to employ waste gases containing chlorin in its production.

A further object of the invention is to provide for the continuous working of the electrolytic process for the production of magnesium and alloys thereof from magnesia or magnesite.

The invention consists broadly in treating in suitable apparatus, a mixture of magnesia and carbon with chlorin continuously supplied from an external source at a suitable temperature for the production of anhydrous magnesium chlorid.

The invention further consists in treating the mixture of magnesia and carbon with waste gases containing chlorin and practically free from oxygen at a suitable temperature for the production of anhydrous magnesium chlorid.

The invention further consists in preparing magnesia in a porous form, suitable for treatment by chlorin or waste gases containing chlorin for use in the production of anhydrous magnesium chlorid, by preparing blocks or briquets of a mixture of magnesite and carbon and baking the said blocks at a high temperature so as to drive off carbon dioxid gas.

The invention also consists in a process either for the production of anhydrous magnesium chlorid or for the electrolysis of magnesium chlorid in which, when used for electrolysis, a mixture of magnesia and carbon is acted upon in a reaction retort connected with, but separate from the electrolytic cell, at a suitable temperature by the chlorin set free at the anode; and the molten magnesium chlorid thereby produced passes into the electrolytic bath to maintain the composition of the electrolyte practically constant; and in which, when used for the production of the said chlorid, a supply of chlorin from an external source (preferably waste gases containing chlorin) is supplied to the said mixture of magnesia and carbon, the electrolytic bath and the reaction retort being maintained at their respective optimum temperatures. The said process is started so as to produce anhydrous magnesium chlorid, and can be changed practically instantaneously to effect electrolysis of the said chlorid, means being provided to supply chlorin to the reaction retort either from the anode chamber of the electrolytic bath or from the external source as desired.

The invention further consists in the apparatus hereinafter described.

In carrying this invention into effect a mixture of magnesite or magnesia and carbon is prepared in such proportions that magnesia and carbon contained in the mixture are in accordance with the equation

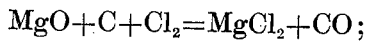

$$MgO + C + Cl_2 = MgCl_2 + CO;$$

the reaction expressed by the said equation being well known from a very early date. It is preferable, however, that the carbon shall be somewhat in excess. Thus, 84 parts of magnesite (or 40 parts of magnesia) are intimately mixed with 12 parts of carbon, or suitable carbonaceous matter. The finely ground mixture of magnesite and carbon is well mixed with tar and pitch in suitable proportions, and pressed into blocks or briquets. These blocks are then baked at high temperature, about 1000° C. to 1200° C., provision being made by excluding air to prevent the carbon in the mixture burning away. During the baking, the magnesite in the blocks gives up carbon dioxid. This renders the blocks porous, and in a condition very suitable for the subsequent action of the chlorin.

The resulting magnesia-carbon blocks cooled out of contact with air are broken into lumps of a suitable size, and placed in a vertical or inclined retort heated to about 750° C. to 800° C. which is appreciably higher than the optimum temperature, 650° C. to 700° C., for the electrolysis of magnesium chlorid. Chlorin gas, preferably dry, passes into this retort and is completely absorbed by the carbon magnesia mixture.

The magnesium chlorid formed is, at the temperature of reaction, liquid, and flows down the retort to the bottom, where it is either collected or is allowed to run direct into an electrolytic cell. The carbon monoxid escapes from the top of the retort, and is burnt or otherwise disposed of. The carbon monoxid may be used as fuel for baking the magnesite carbon blocks, or for heating the reaction retort, or for heating the electrolytic bath.

It is found that under reasonable and practical conditions the reaction proceeds so readily and with such completeness that all chlorin is taken up to form anhydrous magnesium chlorid. The process can thus be used for the removal of chlorin from waste gases, such as those arising from the production of bleaching powder. The said waste gases should be practically free from oxygen.

Alternatively to cooling down after baking, the blocks may be fed through a baking zone or retort directly into the reaction retort in which they are treated with chlorin.

Figure 2:
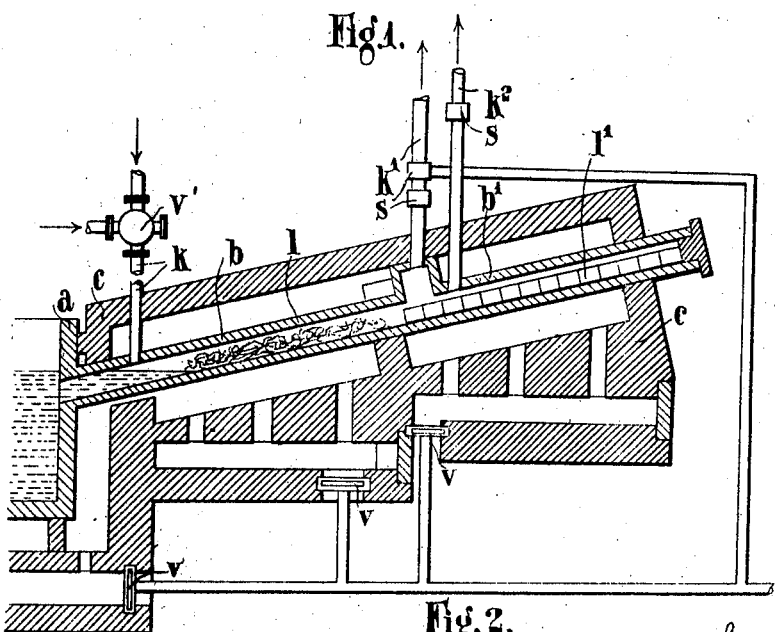

Referring now to the accompanying drawings:

Figure 1 illustrates an electrolytic cell in connection with which is a tube or reaction retort in which regeneration of the electrolyte is provided for according to this invention, and Fig. 2 illustrates an alternative form of the same with which the baking oven for the magnesite carbon briquets is combined.

In carrying the invention into effect for the production of magnesium in this example where the production of magnesium chlorid is made a part of the process of electrolysis, the decomposition cell $a$ is a conveniently shaped tank of steel or other suitable material, protected from oxidation and corrosion by suitable linings, e. g., a lining of firebrick. An inclined tube or retort $b$ of the same material as the tank is provided as a branch from its upper part, and is protected against corrosion by a lining of firebrick. The tank and retort are built into a suitable setting $c$, so that they can be maintained at a temperature between 700° C. and 800° C., preferably by gas firing. Within the tank is placed a crucible $d$ of non-conducting material, containing the metal $e$ to be alloyed with the magnesium, say aluminium. Electrical connection with the metal $e$ is obtained by means of a graphite rod $f$ which is protected where it passes through the electrolyte by the sleeve $g$ of insulating material. The tank also contains the graphite electrode $h$, which forms the anode, and is inclosed, as shown, by the bell $i$, constructed of insulating material. The tank $a$ and retort $b$ are connected by the pipe $k$, which thus conveys the chlorin liberated at the anode $h$ to the retort $b$. The tank and retort are filled to the level shown with the molten electrolyte, composed of a mixture of anhydrous magnesium chlorid and sodium chlorid in suitable proportions, with or without potassium chlorid. The part of the retort, $b$, above the electrolyte is charged with lumps of carbon-magnesia mixture $l$. The chlorin from the anode chamber $i$ is taken up by this mixture with the formation of anhydrous magnesium chlorid which flows down into the electrolyte, enriching the latter just where it is wanted, i. e., in the region about the cathode metal $e$. The tank is preferably provided with a cover to minimize or prevent the action of the atmosphere on the electrolyte, and also to reduce loss of heat.

When it is desired to produce pure magnesium instead of an alloy, it is only necessary to substitute for the illustrated molten metal cathode a cathode arrangement suitable for collecting, in the usual way, magnesium which floats on the surface of the electrolyte.

In working, as the magnesia carbon mixture in the retort melts away under the influence of the chlorin, fresh mixture is fed into the upper end of the retort. The process is thus continuous, the material fed in being magnesia and carbon (obtained from magnesite and carbon) the end products being magnesium or its alloys, and carbon monoxid, which is led off and either utilized or burnt. As the absorption of chlorin in the retort is complete and the amount of chlorin given off at the anode is equivalent to the amount of magnesium withdrawn from the bath, it follows that exactly as much magnesium chlorid is returned to the bath from the retort as is decomposed by the current. The strength of the bath thus remains constant.

We find that, using a separate electrolytic cell and reaction retort and specially prepared magnesia carbon blocks as above described, the absorption of chlorin in the reaction retort is quite complete under suitable conditions, no trace of chlorin being found in the escaping carbon monoxid gas. We have however failed to achieve anything approaching such a result when attempting the process with magnesia carbon blocks placed in the electrolytic bath in a known manner.

In the said known manner of producing magnesium chlorid by electrolysis, provision is, in fact, made for the escape of chlorin.

Alternatively, the baking of the magnesite carbon briquets may be effected in a modified form of the apparatus above described, the magnesite-carbon briquets being fed first into a heating zone or baking retort, in which the carbon dioxid is driven off, and then, without cooling down, into the reaction retort or zone in which they are treated with chlorin or chlorin containing gases. Fig. 2 shows the said modified form of the apparatus. The tube or reaction retort $b$ is provided with or suitably connected to the baking tube $b'$, into which the magnesite carbon briquets $l'$ are fed through a movable door, hopper, or the like, and which may be provided with known means to prevent the escape of gases therefrom when opened to admit the briquets. A pipe $k^2$ is provided for the escape of carbon dioxid gas. A pipe $k'$ is provided for the escape of carbon monoxid gas from the reaction retort $b$. Valves $s$ suitably adjusted may be provided in connection with the pipes $k'$ and $k^2$ for regulating the pressure of the escaping gases.

The gases after heating the baking tube may be led around the reaction retort, and thence around the electrolytic cell; diminishing temperatures being required at these three places as hereinbefore stated. The three said parts may however be independently gas heated, provision for such heating being indicated in the drawing. The gas supply may be controlled by valves $v$, and, after the process is started, carbon monoxid escaping from the reaction retort may be used for the said heating.

The same apparatus may be used either for the electrolytic production of magnesium or its alloys or for the production of anhydrous magnesium chlorid. In the latter case the tank $a$ serves as a collecting vessel for the liquid magnesium chlorid; the crucible $d$, electrodes $f$ and $h$, insulating sleeve $g$ and bell $i$ being removed. Also as in our invention the electrolytic production of magnesium or its alloys is effected, after the process is fairly started with practically no further supply of chlorin from an external source, a three-way valve or its equivalent may be provided at $V'$, so as to allow the chlorin to pass either from the electrolytic bath or from the external source of supply into the reaction retort $b$, as desired.

Having now fully described and ascertained our said invention and the manner in which it is to be performed, we declare that what we claim is:—

1. A process for producing anhydrous magnesium chlorid, consisting in treating at a suitable temperature a mixture of magnesia and carbon in porous form with chlorin, or a gaseous mixture containing chlorin continuously supplied from an external source and practically free from oxygen, and allowing the liquid chlorid to flow off.

2. A process for producing anhydrous magnesium chlorid, consisting in mixing finely divided magnesite and carbon with a suitable tar mixture, briqueting the mass, baking the briquets at a suitable temperature in a neutral or reducing atmosphere to drive off carbon dioxid and render them porous, and acting on the baked magnesia-carbon briquets or fragments thereof at a suitable temperature with chlorine gas or a gaseous mixture containing chlorin and practically free from oxygen.

3. A process for the production of anhydrous magnesium chlorid and the simultaneous electrolysis thereof with no appreciable loss of chlorin, consisting in treating with chlorin a porous coherent mixture of magnesia and carbon maintained at a suitable temperature in a reaction retort, allowing the liquid chlorid to flow off from the said mixture into the electrolytic cell, maintaining the electrolytic cell and its contents at the optimum temperature for the electrolysis, and delivering the chlorin liberated in the electrolytic cell to the reaction retort.

4. In a process of producing anhydrous magnesium chlorid, the steps which consist in heating briquets containing magnesite and carbon to a temperature sufficient to expel carbon dioxid, and thereafter reacting with chlorin upon the heated briquets.

5. In a process of producing anhydrous magnesium chlorid, the steps which consist in heating briquets containing magnesite and carbon to a temperature sufficient to expel carbon dioxid, and feeding the resulting porous and highly heated briquets into an atmosphere containing chlorin.

In testimony whereof we have signed our names to this specification.

GEORGE HERBERT BAILEY.
GLYN WILLIAM ARNOLD FOSTER.